Patented May 15, 1923.

1,455,363

UNITED STATES PATENT OFFICE.

ARTHUR C. SPENCER, OF WASHINGTON, DISTRICT OF COLUMBIA, ASSIGNOR TO THE PERMUTIT COMPANY, OF NEW YORK, N. Y., A CORPORATION OF DELAWARE.

PROCESS OF PURIFYING WATER.

No Drawing.    Application filed November 8, 1916.    Serial No. 130,230.

*To all whom it may concern:*

Be it known that I, ARTHUR C. SPENCER, a citizen of the United States, residing at Washington, in the District of Columbia, have invented certain new and useful Improvements in Processes of Purifying Water, of which the following is a specification.

This invention relates to processes of purifying water; and it comprises a method of purifying water by passing such water over a granulated material comprising or composed of greensand or glauconite, said material after a period of use being treated with a solution of sodium chlorid or other revivifying salt to fit it for re-use in further purifying of water; all as more fully hereinafter described and as claimed.

In the purification of water a common method now in use takes advantage of the properties of certain silicates containing alumina, and other substances, of exchanging bases. These "exchange silicates," as they are called, usually contain sodium and upon contacting them with hard water, i. e., water containing magnesia and lime, the exchange silicates take up the magnesia and lime and give up sodium to the water in their lieu. After a period of action, the exchange silicate becomes exhausted to a greater or less extent, and may thereafter be revivified by treatment with a solution of sodium chlorid, to which it now gives up magnesia and lime in the form of magnesium chlorid and calcium chlorid, taking up sodium in their lieu. It is now ready for re-use.

In the art, it is customary to use alumina-containing exchange silicates manufactured for these purposes by relatively tedious and expensive methods. One such method, giving excellent products, consists in fusing materials containing alumina and silica with alkali in such proportions as to give a melt containing a relatively large amount of alkali. Upon subsequently granulating the fused material and extracting with water, the excess of alkali dissolves out, leaving a hard granular material of a highly pervious nature and good mechanical strength, which is excellently adapted for the stated exchange purposes. In other methods of preparation, silica and alumina are co-precipitated in the presence of alkali, and the slimy or gelatinous precipitates which carry down a certain amount of alkali with them, are converted by special methods into hard granular materials suitable for exchange purposes.

All these materials, however, are relatively expensive, the processes of their production being complicated, and, in a large measure, wasteful of materials.

I have found that I can secure excellent results in the purification of water by employing certain natural materials containing or composed of greensand or glauconite.

Greensand is a material occurring in many places in this country as beds or deposits; and is a mixture of various minerals, among which the substance called glauconite always occurs. Glauconite is substantially a double silicate of iron and potassium, though it may contain other bases as minor constituents. In part the iron is present in the ferrous condition, and in part, at least frequently, in the ferric condition. Some alumina may be present. Glauconite, although not analogous in composition with the described exchange silicates, which contain alumina as a characteristic ingredient, and iron only as an impurity, has, nevertheless, as I have found, very similar properties, in that it is capable of exchanging its contained bases for others. I have elsewhere (Ser. No. 61935, filed Nov. 17, 1915) described and claimed utilization of this fact for the purpose of extracting the contained potash.

These exchange properties may be used in softening water. And I find that for this purpose this material has many important technical advantages. One is that it is not attacked or broken down by water, even very soft water, withstanding high temperatures in contact with soft water or even in contact with water showing some acidity. Although the ordinary exchange silicates are considered as substantially insoluble in water, they do, or may, disintegrate to a slight extent under the conditions mentioned. This slight disintegration is indicated by the presence of $SiO_2$ in the effluent. It has been found that the amount of $SiO_2$ for example in the effluent of an alumino silicate filter is higher than in that from a greensand filter in which the same hot, not very hard water has been softened. Another advantage is that greensand is relatively heavy, because of the iron it contains. As materials of this character are used in granular filter-like beds, it is desirable that the material be fairly heavy to prevent loss by flotation.

The density of greensand makes it desirable for this reason.

The natural greensand is active as an exchange material and may be used to soften water, taking up lime and magnesia and giving a soft effluent water. In revivification of the material by salt, the lime and magnesia are replaced by sodium. The material which is at the start a potassium iron silicate (alkali metal iron silicate), on revivification or regeneration takes up sodium. And repeated revivifications seem to improve its exchange power materially. The nature of its activity in softening water is still somewhat obscure but it apparently is not, at least at first, strictly analogous in detail, though it is as to result, with that of the ordinary artificial exchange silicates.

For my purposes I may use the natural greensand, or greensand marl, as it occurs, i. e., with other natural materials mixed with it (as in the case of certain clays which contain granules of glauconite) or I may separate the glauconite itself by flotation or by other appropriate separating processes. The glauconite grains so obtained may, in a modification of my invention, be usefully employed in conjunction with exchange silicates of the older type made in the wet way, the silica and alumina being precipitated in the presence of glauconite granules which have in addition to their exchange function, a utility in the final product in acting, so to speak, as a weight-giving component.

The glauconite or material containing it may be treated in various ways to enhance or modify its activity or alter its physical properties. It may, for instance, be baked, which, with many samples, increases its exchange activity somewhat. As stated in the acknowledged prior application a preliminary roasting of material of this kind renders it more amorphous in character and better suited for exchange purposes. Glauconite, the basis of greensand or greensand marl, is a mineral of variable constitution, and materials from different localities often react quite differently towards replacing bases. In some varieties, the ferrous iron is only slightly replaceable while in others it is more replaceable. In view of this variability, to a certain extent, the best method of treatment must be determined by trial in each case where a particular greensand is used. I find that greensand is capable of undergoing quite a number of metathetical, or exchange, reactions in addition to those which are here utilized in softening water.

Baking is particularly useful in the case of certain active materials containing both glauconite and clay, where, as it frequently happens, the glauconite is contained in the form of relatively minute grains in a matrix of clay. By baking such a material, the clay is rendered hard, rigid and pervious, while the glauconite granules are held and anchored in its pores. By baking such a material a highly pervious, highly active material may be obtained.

The glauconites or greensands found in the country, as stated, vary somewhat in composition and also in their activity, and a variety of other treatments than baking may be used. The material may, for instance, be extracted with a little weak hydrochloric or sulfuric acid, which extracts some of the base and leaves the residue in a more active condition. Or the material may be, so to speak, regenerated before it is used; being boiled or heated with sodium chlorid, as described in my acknowledged application, to put it at once in the condition in which it occurs after repeated use and revivification of the natural untreated material. If heated with an alkaline material, such as caustic lime or with calcium chlorid, a certain amount of lime is taken up and if the material thereafter be treated with sodium chlorid, it is rendered highly active and suited for immediate use. A very useful expedient in many cases is to treat the material with a little alkali and to expose it to steam under pressure. These various expedients may be combined as, for instance, in treating the baked material with the lime or with the alkali.

Some of the native greensand contains more or less pyrite or iron sulfid in it, which may be removed by magnetic separation—if necessary, after a preliminary roasting; or the mixture may advantageously be roasted somewhat at a low temperature to oxidize the iron sulfid and form iron sulfate or oxid, which may be then washed away. A material, which may be used as raw material for producing a number of useful exchange materials, may be made by heating glauconite at a low temperature (around or below 300° C.) in an atmosphere of a reducing gas such as producer gas, water gas, hydrogen, etc., to reduce the iron to the ferrous or even to the metallic state and thereafter extracting the residual material with acid. This material may now be treated for exchange purposes.

In a typical embodiment of the present invention I take native greensand, which may be that from New Jersey, South Dakota, Texas, etc., and wash and purify it, to free it of soluble matters and mechanical impurities, such as clay. This greensand I then use for purifying hard water, passing the water to be purified through a granular bed of the greensand, in a suitable casing with inlets for hard water, for salt water, for flushing and for backwash water, and outlets for soft water, for used salt solution, and for used wash water, and for draining the filter; also an air inlet and outlet may be arranged. After a time the activity of the material for purifying water begins to diminish; and at this time the flow of water may be diverted and a current of brine or common salt solution passed through it for a time. This revivifies it and fits it for a further period of activity. After flowing the salt solution through the bed, it may be washed with water and then reused for purifying hard water.

If an interruption of the delivery of soft water is not desired, two or more filters can be installed, so that when one filter is exhausted, the second filter will commence operation. The switching over from one filter to the other can be accomplished by automatic valves. These valves may be started from a suitable source of energy after such an amount of water has passed through a filter as to exhaust that filter. In order to prevent too great a resistance (loss of head) it may be advisable to divide the layers of greensand into several thin layers in parallel. The layers of greensand mentioned may, of course, be arranged in series.

The greensand preparations mentioned hereinbefore may be used for many other purposes than that of softening hard water, being used wherever base-exchange properties may be useful. They may, for instance, be treated with manganese chlorid, nickel chlorid, cobalt chlorid, cerium chlorid, etc., to make materials useful for a variety of uses. They may also be used as carriers for catalyst which can be embedded in them. The embedding of such catalysts into the greensand preparations will not destroy the exchange properties, so that they can be used for double purposes as, for instance, for simultaneously softening water and removing chlorin or hypochlorites. In treating water with bleaching powder, it becomes very often very hard, from the lime of the bleaching powder and at the same time there is often a little residual hypochlorite, giving it a taste which is not liked. Such water may be softened and freed of the chlorin taste by using greensand containing a little cobalt; the cobalt acting as a catalyst in breaking up the hypochlorites. In such a catalytic operation, the greensand serves mainly as a carrier for the catalyst but it still retains the ordinary activity for softening water. A manganese preparation made by treating the greensand first by a solution of manganese chlorid and thereafter by a solution of permanganate of potash is particularly useful for removing iron and manganese from water.

Preparations containing manganese or nickel are particularly good for decomposing hypochlorites. Where greensand is charged with manganese oxids, these oxids act as a catalyst on water containing manganese or iron. For this purpose the manganese oxid should be in a high state of oxidation. Ferrous iron, which is the condition in which iron ordinarily occurs in water, is oxidized by the higher manganese oxids with the production of ferric compounds which are less soluble in water and which precipitate. Manganous compounds also form an insoluble precipitate of medium degree of oxidation when passed into contact with material containing $MnO_2$. Manganese preparations for this purpose may be prepared and regenerated by treatment with potassium permanganate or the like. For example, a greensand preparation may be treated with manganese chlorid when it takes up manganese oxid ($MnO$) by an ordinary exchange. This preparation if now treated with potassium permanganate gives a preparation containing embedded $MnO_2$; part of this $MnO_2$ coming from the original manganese oxid and part from the permanganate.

In freeing water of iron or manganese, a manganese preparation made as described may be used until its activity is exhausted, may be then backwashed to free it of separated adhering oxids and then revivified with permanganate solution and once more used.

What I claim is:—

1. The process of purifying water which comprises passing such water through a granular bed comprising greensand until the activity of such greensand is diminished, thereafter revivifying said bed by passing therethrough a solution adapted to react upon the impurities removed in the first operation, washing the bed and once more employing it for the treatment of water.

2. In the softening of hard water, the process which comprises passing hard water through a granular bed comprising greensand, the operation being interrupted from time to time and said granular bed treated with a sodium chlorid solution to regenerate it.

3. The process of purifying water which comprises passing such water through a granular bed comprising a greensand preparation until the activity of such preparation is diminished, thereafter revivifying said bed by passing therethrough a solution adapted to react upon the impurities removed in the first operation, washing the bed and once more employing it for the treatment of water.

4. In the softening of hard water, the process which comprises passing hard water through a granular bed comprising a greensand preparation, the operation being interrupted from time to time and said granular bed treated with a sodium chlorid solution to regenerate it.

5. In the process of softening water wherein a pervious granular bed filter is alternately treated with the water to be purified and with substances capable of taking up materials removed from such water in the purification, utilizing greensand as the active material of such bed.

6. In the process of softening water wherein a pervious granular bed filter is alternately treated with the water to be purified and with substances capable of taking up materials removed from such water in the purification, utilizing a prepared greensand as the active material of such bed.

7. In the purification of water, the process which comprises passing the water through a baked alkali-treated glauconite material.

In testimony whereof, I affix my signature hereto.

ARTHUR C. SPENCER.